(12) United States Patent
Martinez-Vilanova Pinon (10) Patent No.: US 11,879,415 B2
(45) Date of Patent: Jan. 23, 2024

(54) JET ENGINE FOR AIRCRAFT

(71) Applicant: Rafael Martinez-Vilanova Pinon, Albacete (ES)

(72) Inventor: Rafael Martinez-Vilanova Pinon, Albacete (ES)

(73) Assignee: Rafael Mártinez-Vilanova Piñó, Albacete (ES)

( * ) Notice: Subject to any disclaimer, the term of this patent is extended or adjusted under 35 U.S.C. 154(b) by 0 days.

(21) Appl. No.: 18/016,024

(22) PCT Filed: Jul. 13, 2020

(86) PCT No.: PCT/ES2020/070374
§ 371 (c)(1),
(2) Date: Jan. 13, 2023

(87) PCT Pub. No.: WO2022/013459
PCT Pub. Date: Jan. 20, 2022

(65) Prior Publication Data
US 2023/0220814 A1    Jul. 13, 2023

(51) Int. Cl.
*F02K 9/78*    (2006.01)
*F02K 3/10*    (2006.01)
(Continued)

(52) U.S. Cl.
CPC .................. *F02K 9/78* (2013.01); *F02C 3/22* (2013.01); *F02C 3/24* (2013.01); *F02K 1/12* (2013.01);
(Continued)

(58) Field of Classification Search
CPC ... F02K 3/08; F02K 3/10; F02K 3/105; F02K 3/11; F02K 7/16; F02K 7/18; F02K 9/78
See application file for complete search history.

(56) References Cited

U.S. PATENT DOCUMENTS 2,531,761 A * 11/1950 Zucrow ..................... F02K 9/78
                                                          60/39.15
2,641,902 A *  6/1953 Kerr .......................... F02K 7/16
                                                          55/306
(Continued)

FOREIGN PATENT DOCUMENTS

FR    2215538 A1    8/1974
GB     805418 A    12/1958
WO   2015181512 A1   12/2015

OTHER PUBLICATIONS

Int'l Search Report for PCT/ES2020/070374, dated Feb. 4, 2021.

*Primary Examiner* — William H Rodriguez
(74) *Attorney, Agent, or Firm* — MaxGo Law PLLC (57) ABSTRACT

A jet engine for propelling aircraft, capable of providing thrust from rest to high speeds is provided. The engine has an axial compressor (16) or several axial compressors located on the same plane and is driven by a gas generator. At the outlet of the turbine there is a gasification chamber (23) into which more fuel is injected. Combustion of the gases from the gasification chamber is performed in two combustion chambers (18) with a rectangular cross-section, separated by a central body (10). The exhaust of the gases is performed in nozzles, each with a square convergent/divergent cross-section (19) and (21). The cross-section of the throats (26) can be adjusted by means of two mobile elements (20). The final section of the central body (10) forms a wedge-shape (27), enabling the continued expansion of the exhaust gases.

4 Claims, 7 Drawing Sheets

(51) Int. Cl.
*F02K 1/12* (2006.01)
*F02C 3/24* (2006.01)
*F02K 3/08* (2006.01)
*F02C 3/22* (2006.01)

(52) U.S. Cl.
CPC .............. *F02K 1/1207* (2013.01); *F02K 3/08* (2013.01); *F02K 3/10* (2013.01); *F05D 2220/323* (2013.01); *F05D 2240/128* (2013.01)

(56) References Cited

U.S. PATENT DOCUMENTS

| | | | | |
|---|---|---|---|---|
| 2,857,740 | A * | 10/1958 | Hall | F02K 3/025 60/39.15 |
| 2,883,828 | A * | 4/1959 | Howell | F02C 7/224 60/39.35 |
| 2,950,593 | A | 8/1960 | Rae | |
| 2,968,146 | A | 1/1961 | Howell et al. | |
| 3,002,340 | A | 10/1961 | Landerman | |
| 3,030,771 | A * | 4/1962 | Hopper | F02C 3/06 60/764 |
| 3,237,400 | A | 3/1966 | Kuhrt | |
| 3,238,716 | A * | 3/1966 | Sandre | F02K 3/075 60/268 |
| 3,336,753 | A | 8/1967 | Mullen, II et al. | |
| 3,635,029 | A * | 1/1972 | Menioux | F02K 3/11 60/226.3 |
| 3,987,621 | A * | 10/1976 | Sabatella, Jr. | F02K 3/11 60/262 |
| 3,999,378 | A * | 12/1976 | Tatem, Jr. | F23R 3/20 60/737 |
| 4,222,235 | A * | 9/1980 | Adamson | F02K 3/075 60/262 |
| 4,916,896 | A * | 4/1990 | Paul | F02K 7/16 60/801 |
| 5,012,638 | A * | 5/1991 | Grieb | F23R 3/20 60/39.463 |
| 5,014,508 | A * | 5/1991 | Lifka | F02C 3/13 60/768 |
| 5,119,626 | A | 6/1992 | Lardellier et al. | |
| 5,341,640 | A * | 8/1994 | Faulkner | F02K 3/10 60/761 |
| 5,694,768 | A * | 12/1997 | Johnson | F02K 3/077 60/226.3 |
| 5,806,303 | A * | 9/1998 | Johnson | F02K 3/105 60/226.3 |
| 5,867,980 | A * | 2/1999 | Bartos | F02K 7/16 60/226.3 |
| 9,422,889 | B2 * | 8/2016 | Conrardy | F02K 7/16 |
| 2005/0120700 | A1 * | 6/2005 | Tangirala | F02K 3/08 60/39.76 |
| 2005/0138914 | A1 * | 6/2005 | Paul | F02K 9/78 60/226.1 |
| 2007/0119150 | A1 * | 5/2007 | Wood | F02C 7/042 60/226.1 |
| 2015/0275762 | A1 * | 10/2015 | Kenyon | F02C 7/14 60/39.17 |
| 2023/0250777 | A1 * | 8/2023 | Powell | F23R 3/20 60/765 |

* cited by examiner

JET ENGINE FOR AIRCRAFT

FIELD OF THE INVENTION

The invention relates to a heat engine for providing thrust to an aircraft by accelerating atmospheric air through a conduit. As a result of the mechanical elements, the invention relates to a turbomachine. However, the invention differs from typical gas turbine configurations due to the use of a gas generator to drive the turbine.

BACKGROUND OF THE INVENTION

Most aircraft that fly at high speed use gas turbines as engines (with high speeds being understood as supersonic speeds). The most typical configuration is what is known as a turbofan. Low-bypass-ratio turbofans with an afterburner are often used. Engines of this type require enormous development and manufacturing costs.

As additional information, two other alternatives are used in some applications. The first alternative is the rocket engine. Engines of this type present at least two problems: a low specific impulse and a short service life, often being difficult and expensive to reuse after just one use. The second alternative is the ramjet. The main problem with ramjets is that they do not provide thrust at low speed, so the use of another propulsion system is required to reach their operating speed.

SUMMARY OF THE INVENTION

A jet engine for propelling aircraft is provided that is capable of providing thrust from rest to high speeds. The engine has an axial compressor or several axial compressors located on the same plane and is driven by a gas generator. At the outlet of the turbine there is a gasification chamber into which more fuel is injected. Combustion of the gases from the gasification chamber is performed in two combustion chambers with a rectangular cross-section, separated by a central body. The exhaust of the gases is performed in nozzles, each with a square convergent/divergent cross-section. The cross-section of the throats can be adjusted by two mobile elements. The final section of the central body forms a wedge-shape, enabling the continued expansion of the exhaust gases.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
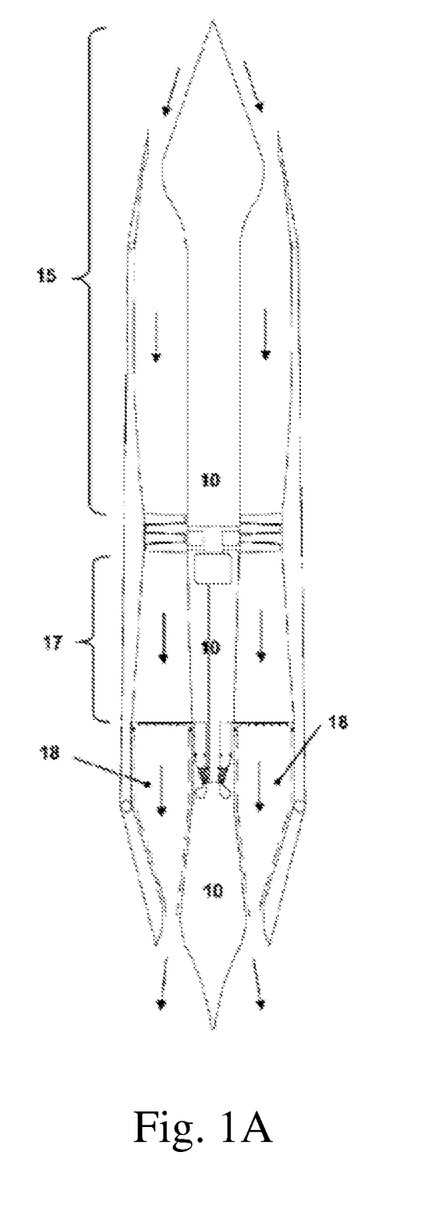
FIG. 1A is an overall schematic cutaway view of an engine illustrating an air intake, a transition area, and converging nozzles according to embodiments of the present invention.
Figure 1B:
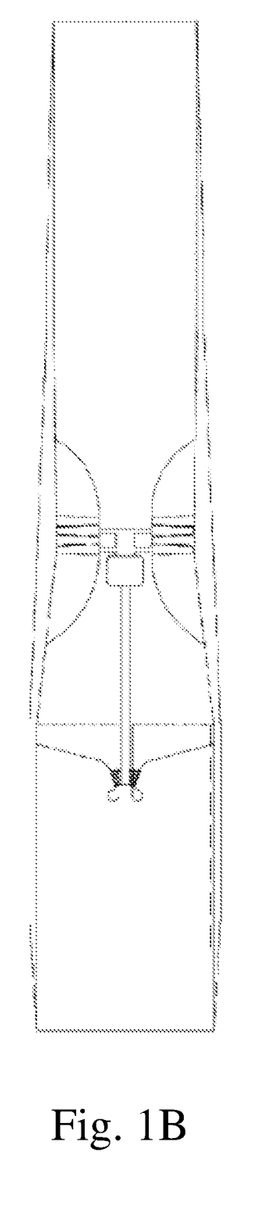
FIG. 1B is a side view schematic cutaway view of FIG. 1A illustrating the air intake, the transition area, and the converging nozzles according to embodiments of the present invention.

The present invention relates to a jet engine which can be more economical to develop than the aforementioned traditional engine, namely the low-bypass turbofan with an afterburner. FIGS. 1A and 1B show a diagram of the invention, hereinafter the ENGINE. In particular, two cross-sections are shown in planes that contain the shaft (13) of the ENGINE and are perpendicular to one another. The air flow is represented by arrows.

Figure 2:
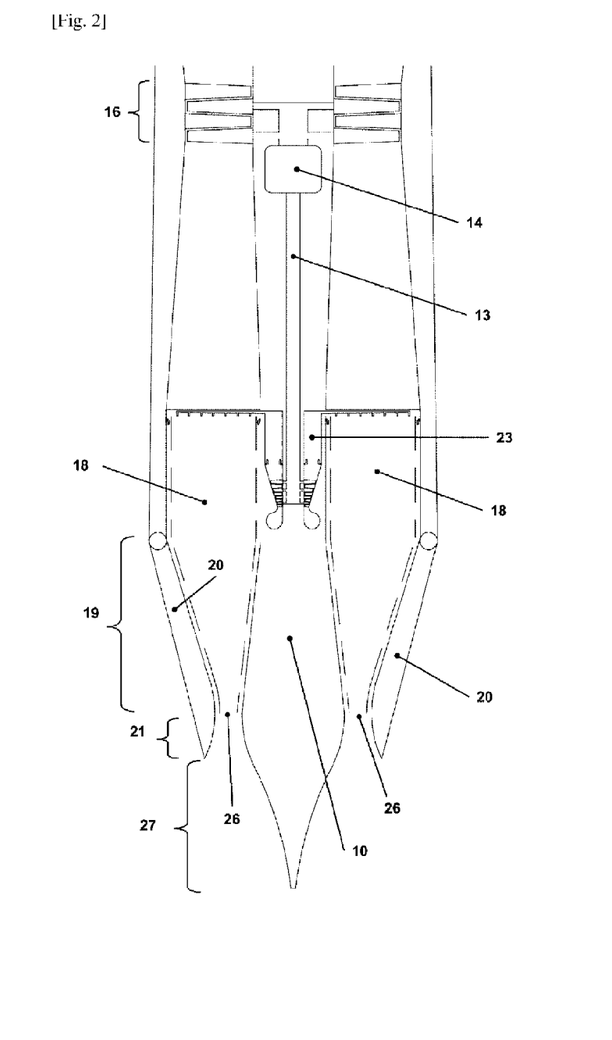
FIG. 2 is a detailed enlargement of the FIG. 1A illustrating the transition area and the converging nozzles according to embodiments of the present invention.

Although FIGS. 1A and 1B depict the ENGINE in a schematic manner, the most significant elements are shown in a size representative of a real application. As the sizes of these components are very different, in FIG. 2 an area of FIG. 1A is reproduced on a larger scale, and in FIG. 3 an area of FIG. 2 is reproduced on a larger scale.

The present invention relates to a jet engine which can be more economical to develop than the aforementioned traditional engine, namely the low-bypass turbofan with an afterburner. FIG. 1 shows a diagram of the invention, hereinafter the ENGINE. In particular, two cross-sections are shown in planes that contain the shaft (13) of the ENGINE and are perpendicular to one another. The air flow is represented by arrows.

Although FIG. 1 depicts the ENGINE in a schematic manner, the most significant elements are shown in a size representative of a real application. As the sizes of these components are very different, in FIG. 2 an area of FIG. 1 is reproduced on a larger scale, and in FIG. 3 an area of FIG. 2 is reproduced on a larger scale.

The ENGINE consists of a central body (10) in which, in addition to other auxiliary elements, the following elements are located to drive the compressor (16):

A gas generator (11) into which a liquid fuel and a liquid oxidant are injected at high pressure in a ratio rich in fuel, such that not all the fuel is burned in this chamber. As its name suggests, the function of the gas generator is to generate gas at high pressure.

A turbine (12) that is driven with the gases from the gas generator and moves a high rotational speed shaft (13).

A transmission box (14) in which the rotational speed is reduced in order to adapt same to the needs of the compressor (16).

The jet engine itself consists of the following elements:

An air intake (15) according to the state of the art. Only one example is depicted in FIG. 1, but it can be in various forms. Different configurations typically having an element of variable geometry have been successfully tested in the last 60 years. Like any intake of a jet engine, the function thereof is to adjust air consumption and air entry speed to the ENGINE's needs. In most of the flight envelope it will act as a diffuser; in particular, when the flight speed is supersonic, one or more shock waves are generated to reduce the speed of the air, with the entry speed to the compressor (16) being always subsonic.

An axial compressor (16) with at least one compression stage. Axial compressors are made up of successive stages of blade rows located perpendicular to the shaft of the compressor. The blade rows that remain fixed are called stators, and the blade rows that rotate integrally with the shaft are called rotors. It is common for one of the stators, or even two stators, to have orientable blades; in the event that this technical solution is adopted, the adjustable stator will be located in the first row of the compressor and/or in the last row of the compressor.

A transition area (17) from the outlet of the axial compressor to two combustion chambers with a rectangular cross-section (18). The function of this transition area is to keep head losses at reasonable values, therefore, it will be as long as necessary to perform this task.

Two combustion chambers (18) with a rectangular cross-section separated by the central body (10). For clarification, the figure does not depict the typical flame stabilizers of many combustion chambers, which does not mean that they may not be necessary. The typical perforated sheet that separates the colder flow in contact with the chamber wall from the hot flow in the rest of the chamber is indeed depicted with a dashed line.

Two converging nozzles (19). To allow adjusting the cross-section of the throats (26). Depending on the ENGINE operation and flight conditions, the angles of the nozzles are adjusted by means of two articulated mobile elements (20). Once reaching the throats of the nozzles (26), the central body (10) and the two mobile elements (20) form two divergent nozzles (21) with a small expansion ratio.

Finally, the central body (10) narrows at the end of the ENGINE, forming a wedge-shape (27) that allows, when necessary, a greater expansion of the exhaust gases, that is, it acts as an open diverging nozzle.

Figure 4:
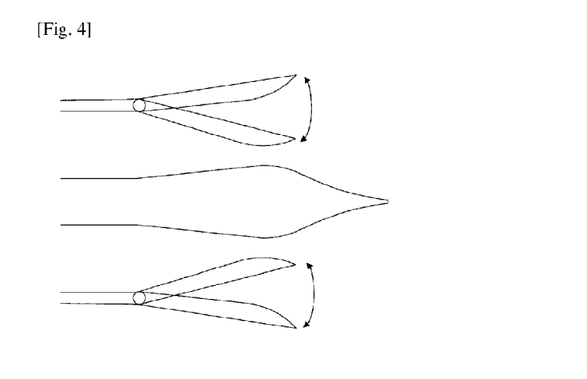
FIG. 4 is a detailed enlargement of the converging nozzles of FIG. 1A according to embodiments of the present invention.

Depending on the angle of the mobile elements (20), an exhaust with a more or less constant cross-section, that is, without forming a converging nozzle, can be achieved. Or it is possible to obtain a nozzle with a very pronounced narrowing in the throat (26), as shown in FIG. 4. In contrast, the expansion of the exhaust gases is adjusted automatically as a result of the wedge-shape (27).

The ENGINE has three operating modes. The main mode is referred to as the normal mode, and is characterized by the following elements:

A diffuser at the outlet of the turbine (22).

A gasification chamber (23) into which the diffuser (22) discharges. The speed of the exhaust gases in this chamber is relatively low, and there is injected more fuel which, as a result of the effect of temperature, is gasified.

Gases from the gasification chamber are led to an injector array (24) which distributes the gases between the two combustion chambers (18). The injectors are sized and placed such that gases are not injected into the region close to the walls, thereby ensuring a lower temperature on the walls of the combustion chambers (18) and the walls of the nozzles (19) and (21).

In addition, it is possible to operate the ENGINE in an alternative mode referred to as the super-thrust mode. In this mode, the objective is to obtain a thrust greater than the normal mode. To that end, fuel in excess of the oxygen available is injected into the combustion chambers (18), that is, the ENGINE works with a mixture rich in fuel, unlike the normal operating mode mentioned above in which not all the available oxygen is consumed.

In this mode, not all the fuel is injected into the gas generator (11) and the gasification chamber (23). In addition, part of the fuel is injected directly into the combustion chambers (18), in a series of injectors (25) placed on the periphery of each combustion chamber (18) and, if necessary, on the periphery of each nozzle (19) and (21). This additional fuel, in addition to helping to increase thrust, ensures a lower temperature on the walls of the combustion chamber (18) and the walls of the nozzles (19) and (21).

In addition to a liquid oxidant to react in the gas generator (11), another differentiating feature of the ENGINE is the use of two liquid fuels. Preferably, a gaseous fuel with a low molecular weight that is stored liquefied in a pressurized tank, and depending on the choice of fuel, the tank will also be cryogenic. And a fuel with a higher molecular weight that will preferably be liquid at ambient conditions. The fuel with a lower molecular weight will preferably be injected into the gas generator (11), and the fuel with a higher molecular weight will preferably be used in the gasification chamber (23). Both fuels can also be used for direct injection into the combustion chamber (25) in the super-thrust mode. However, depending on the needs of thrust and the speed of the aircraft, a more or less proportion of each of the two fuels can be chosen.

It is emphasized that the use of two fuels is considered the optimal solution, but if simplicity is desired, the ENGINE can also work with a single type of fuel, in which case it will be a fuel with a low molecular weight.

Like any other heat engine, a series of auxiliary elements are required, the following being the most important:

An electrical machine in engagement with the compressor (16), or with one of the stages of the transmission box (14). This electrical machine can work as a generator, providing electrical power to power the aircraft and the auxiliary systems of the ENGINE. The electrical machine can also work as an electric motor, for example, to facilitate starting the ENGINE.

Finally, the electrical machine driving the compressor (16) without the help of the gas generator (11) may be of interest. This would be the third operating mode and is referred to as the electric mode. In this mode, the ENGINE requires an external power supply, for example, batteries. In the electric mode, neither fuel nor oxidant is injected, so the thrust is quite low, but it can be useful in certain circumstances, for example, as emergency in the event of a breakdown, or to fly at low speed, or on descending trajectories, or to generate less noise.

Other notable auxiliary elements are the pumps. High pressure pumps are required to feed the gas generator (11).

Low-pressure pumps are required to inject fuel into the gasification chamber (23) or into the combustion chamber (25). The pumps can be driven mechanically by connecting them to one of the shafts of the ENGINE, or can be driven by electric motors, or a combination of both options.

Like any thermal engine, a cooling system is required so that the components of the ENGINE with thermal load do not exceed the design temperatures; the most noteworthy ENGINE cooling system is the heat sink. For applications with flight speeds up to, for example, Mach 2.5, heat exchange with atmospheric air can be carried out. For applications with higher speeds, fuel and oxidant (or any other fluid carried by the aircraft, such as water, for example) can be used as a heat sink. The first option is the conventional solution for cooling gas turbines; the second option is the conventional solution for cooling rocket engines.

For its development, the ENGINE requires the same elements and subsystems as any gas turbine. The parts will be mostly metal parts, and the alloys will be chosen, among other reasons, based on the working temperatures. In colder areas, steels and titanium alloys can be used, for example. In areas with moderate temperatures, stainless steels and refractory steels can be used, for example. Finally, in areas with higher temperatures, specific high-temperature alloys, for example, nickel-based alloys, must be used.

Besides the elements already mentioned, the ENGINE will also require the following typical elements of a gas turbine for its development: sensors of various types, actuators, valves, an electronic control system, and an ignition system. It will also be necessary to ensure a reasonably low friction between the mobile elements by means of bearings, bushings, and a lubrication system. A hydraulic system and/or electric servos will be necessary to drive the actuators.

The rotational speed of the ENGINE is controlled by acting on the pumps that inject the fuel and the oxidant into the gas generator (11). It is possible to vary both the flow rate/pressure of the liquids and their proportion. Thrust is also regulated by the amount of fuel that is injected into the gasification chamber (23), and if the super-thrust mode is used with the amount of fuel that is injected directly into the combustion chamber (25).

In exhaust control, the objective is to adjust the cross-section of the throats (26) in order to reach critical conditions, and therefore supersonic speeds are reached after the throats (26). In the area of the flight envelope where the pressure in the combustion chamber (18) is not high enough to allow critical conditions, then the cross-section of the throats (26) is adjusted so that the pressure at the exhaust outlet is similar to atmospheric pressure.

Figure 5:
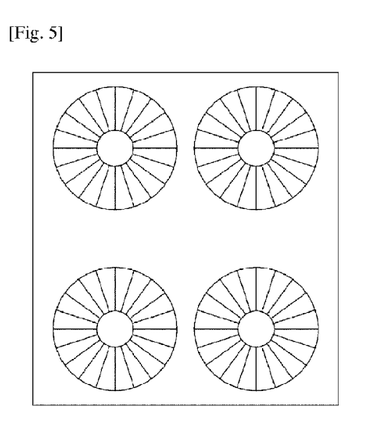
FIG. 5 is an alternative architecture which shows a section perpendicular to the shaft of an engine, where the section is made at the height of a set of compressors, and in particular of four compressors according to embodiments of the present invention.

As can be seen in FIG. 1, a weakness of the ENGINE depicted is that space is required for the transition area (17) to ensure that the axial symmetry flow at the outlet of the compressor adapts to the two combustion chambers (18) with a rectangular section. The length of the transition area (17) can be reduced if instead of a single compressor, two, four, or even six compressors are placed on the same plane, working in parallel, such that half of the compressors feed one combustion chamber (18) and the other half feed the other combustion chamber (18). This alternative architecture is shown in FIG. 5. This figure shows a section perpendicular to the shaft of the ENGINE. The section is made at the height of the compressors, and in particular the option of four compressors is shown. The price to pay for this solution is a more complex system. All the compressors can be driven by a single turbine, or each compressor can be driven by its turbine with its gasification chamber.

Figure 6:
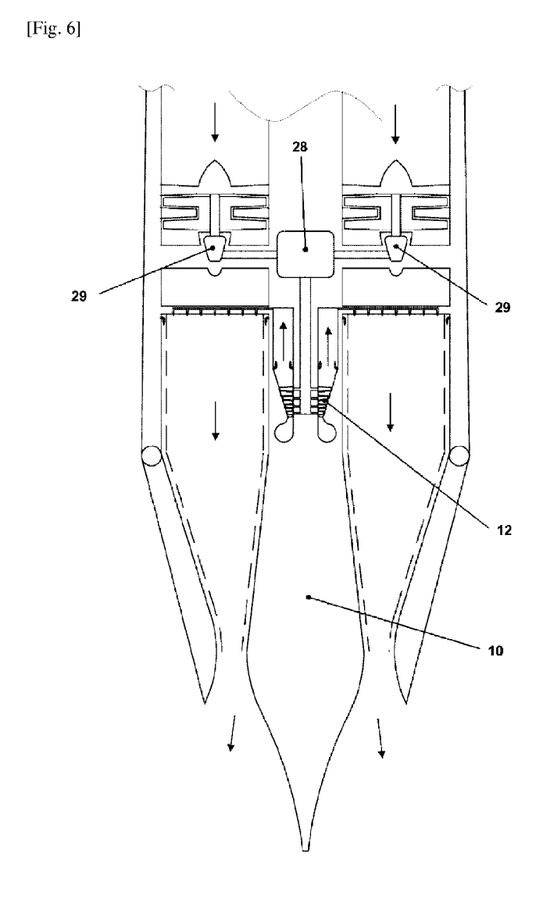
FIG. 6 is a detailed view of an additional secondary transmission box used in a first option for cooling gas turbines in an engine according to embodiments of the present invention.

FIG. 6 shows a diagram of the first option, with a turbine (12) in the central body (10) driving several compressors. In this case, the transmission system is complicated, where there is a need for an additional secondary transmission box (29) in each compressor and a main transmission box with multiple outputs (28).

Figure 3:
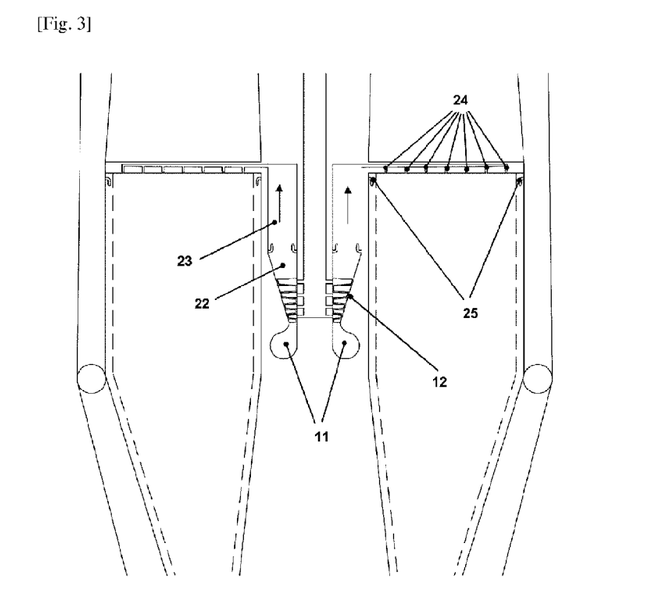
FIG. 3 is a detailed enlargement of the FIG. 2 illustrating an injector array, a gasification chamber into which a diffuser discharges, a gas generator according to embodiments of the present invention.
Figure 7:
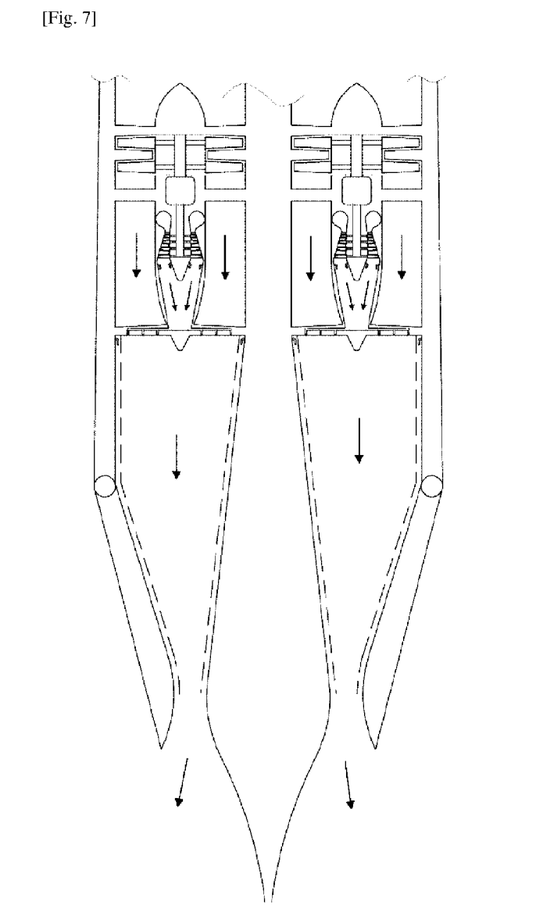
FIG. 7 is a detailed view of a second option for cooling gas turbines in an engine according to embodiments of the present invention.

FIG. 7 shows a diagram of the second option. In FIG. 7, the direction of the flow of the gas generator has been intentionally inverted. In FIGS. 3 and 6 the flow is opposite the forward flow, in FIG. 7 the flow of the gas generator is in the same direction as the forward flow. It should be noted that the ENGINE can work with the gas generator oriented in the forward direction or in the opposite direction.

Figure 8:
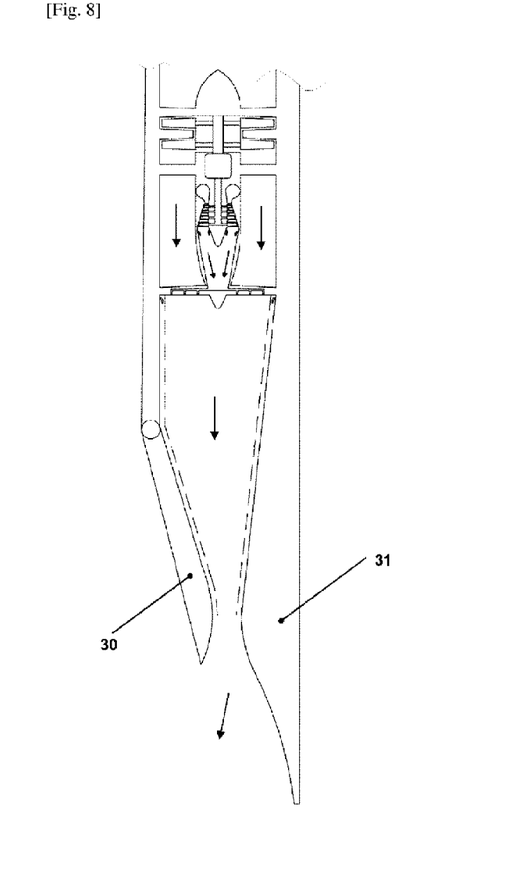
FIG. 8 is a detailed view of an engine configuration where half of the second option for cooling gas turbines in an engine as shown in FIG. 7 is removed according to embodiments of the present invention.

The ENGINE in the configuration shown in FIG. 7 can be simplified by removing the half, as shown in FIG. 8. This configuration is also viable. In this configuration, the central body (10) is reduced to one of the sides of the ENGINE, and the wedge-shape (27) that allows open expansion becomes a ramp (31). On the other side of the nozzle, the two mobile elements (20) are reduced to a single mobile element (30). The notable drawback of this configuration is that the symmetry in the nozzle is lost, therefore, depending on the operating conditions, the thrust angle will vary. For aircraft purposes, this configuration introduces a moment that varies at different points in the flight envelope.

LIST OF ELEMENTS INDICATED IN THE DRAWINGS 10 central body
11 gas generator
12 turbine
13 high rotational speed shaft
14 transmission box
15 air intake
16 axial compressor
17 transition area
18 combustion chambers
19 converging nozzles
20 mobile elements
21 diverging nozzles
22 turbine outlet diffuser
23 gasification chamber
24 injector array
25 injectors for the super-thrust mode
26 throats
27 wedge-shape
28 transmission box with several outputs
29 secondary transmission box
30 a mobile element
31 ramp

The invention claimed is:

1. A jet engine that is capable of providing thrust to an aircraft by accelerating atmospheric air through a conduit comprising:
   an axial compressor (16) connected by a transmission box with a high rotational speed shaft (13) that propels it;
   an air intake (15) that adjusts the speed of the air to a subsonic speed and leads it to the axial compressor (16);
   a gas generator (11) in which a mixture rich in fuel and oxidant is burned at high pressure;
   a turbine (12) connected to the gas generator and connected to the high rotational speed shaft (13) that moves the axial compressor (16);
   a diffuser (22) at the outlet of the turbine (12) that discharges into a gasification chamber (23) into which more fuel is injected, the compressor adapted to discharge into a transition area (17) in which the air flow is led towards two combustion chambers (18) with a rectangular cross- section separated by a central body (10);

a pipe system that leads gases from a gasification chamber (23) to an injector array (24) in the combustion chamber (18) and two converging nozzles (19) with a rectangular cross-section connected with each of the combustion chambers (18) and with two throats (26) with a rectangular cross-section resulting from two mobile elements (20) on the side opposite the central body (10), the cross-section of the throats (26) being variable;

two diverging nozzles with a rectangular cross-section connected with the throats (26), wherein the central body (10) ends in a geometry in the form of a wedge-shape (27); and an electrical machine connected to any of the shafts of the engine, the electrical machine working as an electric motor and an electric generator.

2. The jet engine according to claim 1, comprising two, four, or six compressors placed on the same plane, all of them driven with a single turbine and comprising a main transmission box (28) that has an input shaft coming from the turbine, and as many output shafts as the number of compressors, and a secondary transmission box (29) in each one of the compressors.

3. The jet engine according to claim 1, comprising two, four, or six compressors placed on the same plane; and wherein each compressor is driven with an independent turbine, each turbine having its own gasification chamber.

4. The jet engine according to claim 1 comprising one, two, or three compressors arranged on the same plane, and the same number of turbines and gasification chambers and a ramp (31) and a single mobile element (30) on the other side of the nozzle.

* * * * *